(12) United States Patent
Hassell et al.

(10) Patent No.: US 11,993,043 B2
(45) Date of Patent: May 28, 2024

(54) EXPANDABLE BELT AND TREAD DRUM WITH MAGNETIC DECK FIXING

(71) Applicant: Davian Enterprises, LLC, Greenback, TN (US)

(72) Inventors: Stuart J. Hassell, West Midlands (GB); William A. Jones, West Midlands (GB)

(73) Assignee: Davian Enterprises, LLC, Greenback, TN (US)

( * ) Notice: Subject to any disclaimer, the term of this patent is extended or adjusted under 35 U.S.C. 154(b) by 14 days.

(21) Appl. No.: 17/541,397

(22) Filed: Dec. 3, 2021

(65) Prior Publication Data

US 2022/0250345 A1 Aug. 11, 2022

Related U.S. Application Data

(60) Provisional application No. 63/120,811, filed on Dec. 3, 2020.

(51) Int. Cl.
*B29D 30/26* (2006.01)
*B29D 30/24* (2006.01)
*B29L 30/00* (2006.01)

(52) U.S. Cl.
CPC .......... *B29D 30/26* (2013.01); *B29D 30/242* (2013.01); *B29D 2030/2657* (2013.01); *B29D 2030/2678* (2013.01); *B29L 2030/002* (2013.01); *B29L 2030/005* (2013.01)

(58) Field of Classification Search
CPC ............................................. B29D 2030/2678
See application file for complete search history.

(56) References Cited

U.S. PATENT DOCUMENTS

| | | | |
|---|---|---|---|
| 1,233,567 | A | 7/1917 | William |
| 1,750,728 | A | 3/1930 | Robison |
| 2,073,729 | A | 3/1937 | Bostwick |
| 2,168,897 | A | 8/1939 | Bostwick |
| 2,201,469 | A | 5/1940 | Bostwick |
| RE22,369 | E | 8/1943 | Bostwick |
| 2,335,169 | A | 11/1943 | Bostwick |
| 2,353,767 | A | 7/1944 | Schnedarek |
| 2,367,831 | A | 1/1945 | Manson |
| 2,529,861 | A | 11/1950 | Angell et al. |
| 2,614,057 | A | 10/1952 | Ericson et al. |

(Continued)

FOREIGN PATENT DOCUMENTS

| | | | |
|---|---|---|---|
| CA | 2142004 A1 | 8/1995 | |
| CA | 2188639 A1 | 4/1997 | |

(Continued)

OTHER PUBLICATIONS

Muramatsu JPH085793Y2 1996 English translation (Year: 1996).*

(Continued)

*Primary Examiner* — Jacob T Minskey
*Assistant Examiner* — Adrien J Bernard
(74) *Attorney, Agent, or Firm* — Blanchard Horton PLLC

(57) ABSTRACT

An expandable belt and tread drum with magnetic deck fixing includes an assembly defining a portion of an arcuate outer circumferential working surface of a tire building drum. The assembly comprises a deck segment carrier and one or more magnetic members provided to the deck segment carrier and configured to attach a deck segment to the deck segment carrier by magnetic force.

18 Claims, 5 Drawing Sheets

(56) References Cited

U.S. PATENT DOCUMENTS

| | | |
|---|---|---|
| 2,687,160 A | 8/1954 | Norton |
| 2,699,198 A | 1/1955 | Balzhiser |
| 2,715,932 A | 8/1955 | Frazier |
| 2,728,616 A | 12/1955 | Potter |
| 3,077,918 A | 2/1963 | John |
| 3,101,289 A | 8/1963 | Dario et al. |
| 3,111,444 A | 11/1963 | Jacques |
| 3,111,445 A | 11/1963 | Jacques et al. |
| 3,140,216 A | 7/1964 | Shilts et al. |
| 3,207,648 A | 9/1965 | Shilts |
| 3,346,434 A | 10/1967 | Fulton |
| 3,366,526 A | 1/1968 | Winslow |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Cooper et al. |
| 3,489,634 A | 1/1970 | Pizzo et al. |
| 3,507,528 A | 4/1970 | Desmarchais |
| 3,547,733 A | 12/1970 | Leblond |
| 3,598,673 A | 8/1971 | Renato |
| 3,607,558 A | 9/1971 | Nebout |
| 3,616,059 A | 10/1971 | Frazier |
| 3,644,162 A | 2/1972 | Appleby et al. |
| 3,676,261 A | 7/1972 | Appleby et al. |
| 3,694,290 A | 9/1972 | Pacciarini et al. |
| 3,695,974 A | 10/1972 | Henley |
| 3,784,426 A | 1/1974 | Woodhall et al. |
| 3,787,262 A | 1/1974 | Appleby et al. |
| 3,816,218 A | 6/1974 | Felten |
| 3,833,444 A | 9/1974 | Mallory |
| 3,837,968 A | 9/1974 | Marra |
| 3,867,229 A | 2/1975 | Marra |
| 3,873,398 A | 3/1975 | Yokoo et al. |
| 3,887,423 A | 6/1975 | Gazuit |
| 3,929,546 A | 12/1975 | Katagiri et al. |
| 3,932,256 A | 1/1976 | Touchette |
| 3,948,717 A | 4/1976 | Suzuki et al. |
| 4,010,058 A | 3/1977 | Kubinski et al. |
| 4,105,487 A | 8/1978 | Suzuki et al. |
| 4,126,507 A | 11/1978 | Kim et al. |
| 4,128,450 A | 12/1978 | Cantarutti |
| 4,131,500 A | 12/1978 | Wilde et al. |
| 4,149,927 A | 4/1979 | Lauer, Jr. |
| 4,151,035 A | 4/1979 | Jellison |
| 4,155,796 A | 5/1979 | Rambacher |
| 4,190,482 A | 2/1980 | Yabe |
| 4,210,482 A | 7/1980 | Collins |
| 4,220,494 A | 9/1980 | Kawaida et al. |
| 4,230,517 A | 10/1980 | Enders |
| 4,239,579 A | 12/1980 | Felten et al. |
| 4,292,112 A | 9/1981 | Kumagai |
| 4,312,696 A | 1/1982 | Bryant |
| 4,324,604 A | 4/1982 | Alexander et al. |
| 4,325,764 A | 4/1982 | Appleby et al. |
| 4,392,899 A | 7/1983 | Bertoldo |
| 4,425,180 A | 1/1984 | Samokhvalov et al. |
| 4,436,574 A | 3/1984 | Long et al. |
| 4,445,962 A | 5/1984 | Felder |
| 4,469,546 A | 9/1984 | Klose et al. |
| 4,472,233 A | 9/1984 | Fukamachi et al. |
| 4,473,427 A | 9/1984 | Irie |
| 4,510,012 A | 4/1985 | Kawaida et al. |
| 4,519,279 A | 5/1985 | Ruggeri |
| 4,521,269 A | 6/1985 | Ozawa |
| 4,547,251 A | 10/1985 | Landsness |
| 4,582,557 A | 4/1986 | Enders |
| 4,626,302 A | 12/1986 | Casey et al. |
| 4,636,277 A | 1/1987 | Owen et al. |
| 4,729,541 A | 3/1988 | Maier |
| 4,780,171 A | 10/1988 | Byerley |
| 4,798,647 A | 1/1989 | Haas |
| 4,861,123 A | 8/1989 | Russell |
| 4,861,173 A | 8/1989 | Kemp |
| 5,047,108 A | 9/1991 | Byerley |
| 5,066,354 A | 11/1991 | Benjamin |
| 5,071,498 A | 12/1991 | Nishiide et al. |
| 5,078,819 A | 1/1992 | Sergel et al. |
| 5,089,077 A | 2/1992 | Byerley |
| 5,203,947 A | 4/1993 | Boeker |
| 5,223,074 A | 6/1993 | Miyanaga et al. |
| 5,225,028 A | 7/1993 | Bierens |
| 5,232,542 A | 8/1993 | Norjiri et al. |
| 5,264,068 A | 11/1993 | Masuda |
| 5,320,701 A | 6/1994 | Jellison et al. |
| 5,354,405 A | 10/1994 | Byerley |
| 5,380,384 A | 1/1995 | Tokunaga et al. |
| 5,441,587 A | 8/1995 | Byerley |
| 5,500,074 A | 3/1996 | Suzuki |
| 5,505,803 A | 4/1996 | Byerley |
| 5,558,733 A | 9/1996 | Byerley |
| 5,618,374 A | 4/1997 | Byerley |
| 5,634,745 A | 6/1997 | Wiman et al. |
| 5,635,016 A | 6/1997 | Byerley |
| 5,650,034 A | 7/1997 | Siegenthaler |
| 5,709,768 A | 1/1998 | Byerley |
| 5,735,995 A | 4/1998 | Bull et al. |
| 5,755,922 A | 5/1998 | Baldoni et al. |
| 5,766,408 A | 6/1998 | Ogawa |
| 6,004,250 A | 12/1999 | Byerley |
| 6,007,268 A | 12/1999 | Whittington et al. |
| 6,013,147 A | 1/2000 | Byerley |
| 6,058,999 A | 5/2000 | Roberts et al. |
| 6,117,269 A | 9/2000 | Pizzorno |
| 6,152,645 A | 11/2000 | Sanford |
| 6,238,292 B1 | 5/2001 | Pelkey |
| 6,336,485 B1 | 1/2002 | Kaneko et al. |
| 6,390,166 B1 | 5/2002 | Roberts et al. |
| 6,457,505 B1 | 10/2002 | Byerley |
| 6,475,319 B1 | 11/2002 | Akiyama |
| 6,539,998 B2 | 4/2003 | Sergel et al. |
| 6,571,682 B2 | 6/2003 | Roberts et al. |
| 6,585,022 B1 | 7/2003 | Rex |
| 6,602,372 B1 | 8/2003 | Byerley |
| 6,673,183 B2 | 1/2004 | Byerley |
| 6,793,752 B2 | 9/2004 | Lemaire et al. |
| 7,000,905 B1 | 2/2006 | Lutter et al. |
| 7,287,772 B2 | 10/2007 | James |
| 7,288,160 B2 | 10/2007 | Roedseth et al. |
| 7,370,897 B2 | 5/2008 | Fukazawa |
| 7,637,665 B2 | 12/2009 | Cook |
| 7,699,952 B2 | 4/2010 | Linne et al. |
| 7,837,816 B2 | 11/2010 | Linne et al. |
| 8,056,597 B2 | 11/2011 | Byerley |
| 8,091,602 B2 | 1/2012 | Roberts et al. |
| 8,272,417 B2 | 9/2012 | Painter |
| 8,555,944 B2 | 10/2013 | Painter |
| 8,602,078 B2 | 12/2013 | Byerley |
| 8,701,731 B2 | 4/2014 | Roberts et al. |
| 9,044,908 B2 | 6/2015 | Babin |
| 9,427,925 B2 | 8/2016 | Araki |
| 10,189,221 B2 | 1/2019 | Jones et al. |
| 2003/0056874 A1 | 3/2003 | Durand |
| 2003/0168144 A1 | 9/2003 | Weaver et al. |
| 2003/0197389 A1 | 10/2003 | Moilanen et al. |
| 2004/0239134 A1 | 12/2004 | Fukazawa |
| 2006/0000554 A1 | 1/2006 | Kitz et al. |
| 2006/0127519 A1* | 6/2006 | Uyttenboogaart ... B29D 30/242 425/34.2 |
| 2008/0202690 A1 | 8/2008 | Painter |
| 2009/0151873 A1 | 6/2009 | Pinto et al. |
| 2010/0000658 A1 | 1/2010 | Roberts et al. |
| 2010/0101732 A1 | 4/2010 | Howley et al. |
| 2010/0186864 A1 | 7/2010 | Koopman et al. |
| 2011/0303366 A1 | 12/2011 | Byerley |
| 2012/0017720 A1 | 1/2012 | Painter |
| 2012/0033906 A1 | 2/2012 | Painter |
| 2012/0090787 A1 | 4/2012 | Jones et al. |
| 2012/0168087 A1 | 7/2012 | Byerley |
| 2012/0222822 A1 | 9/2012 | Jones et al. |
| 2012/0256434 A1 | 10/2012 | Roberts et al. |
| 2013/0008611 A1 | 1/2013 | Marcus et al. |
| 2013/0168023 A1 | 7/2013 | Babin |
| 2014/0048212 A1 | 2/2014 | Weaver et al. |
| 2014/0116601 A1 | 5/2014 | Bormann |

(56) References Cited

U.S. PATENT DOCUMENTS

| | | |
|---|---|---|
| 2014/0213330 A1 | 7/2014 | Oh |
| 2014/0216660 A1 | 8/2014 | Jones et al. |
| 2014/0345784 A1* | 11/2014 | D'Oria ............... B29D 30/26 156/115 |
| 2014/0360673 A1 | 12/2014 | Marcus, Jr. |
| 2015/0028147 A1 | 1/2015 | Rich |
| 2015/0239190 A1 | 8/2015 | Currie et al. |
| 2016/0159023 A1 | 6/2016 | Delorme et al. |
| 2016/0176138 A1 | 6/2016 | Guzman |
| 2020/0101682 A1 | 4/2020 | Hassell et al. |
| 2020/0238647 A1 | 7/2020 | McCleery |

FOREIGN PATENT DOCUMENTS

| | | | |
|---|---|---|---|
| CA | 2219387 A1 | 4/1998 | |
| DE | 2705504 A1 | 8/1978 | |
| DE | 19913241 C1 | 9/2000 | |
| DE | 102009025759 A1 | 11/2010 | |
| DE | 102009044510 A1 * | 5/2011 | ........... B29D 30/242 |
| EP | 1621327 A1 | 2/2006 | |
| EP | 1688240 A1 | 8/2006 | |
| EP | 2155481 A1 | 2/2010 | |
| EP | 2504159 A1 | 10/2012 | |
| GB | 2323573 A | 9/1998 | |
| JP | 58179633 A | 10/1983 | |
| JP | S60196330 A | 10/1985 | |
| JP | H085793 Y2 * | 2/1996 | ............ B29D 30/26 |
| JP | 2007136935 A | 6/2007 | |
| JP | 2008221750 A | 9/2008 | |
| JP | 2009274392 A | 11/2009 | |
| JP | 2011255768 A | 12/2011 | |
| JP | 2013018274 A | 1/2013 | |
| JP | 5562470 B1 | 7/2014 | |
| KR | 100963503 B1 | 6/2010 | |
| NL | 9401271 A | 3/1995 | |
| RU | 2381899 C2 | 2/2010 | |
| SU | 1106682 A1 | 8/1984 | |
| WO | 2001007242 A1 | 2/2001 | |
| WO | 2006003058 A1 | 1/2006 | |
| WO | 2008025598 A1 | 3/2008 | |
| WO | 2008152453 A1 | 12/2008 | |
| WO | 2009058296 A1 | 5/2009 | |
| WO | 2010052103 A1 | 5/2010 | |
| WO | 2011064500 A1 | 6/2011 | |
| WO | 2011118166 A1 | 9/2011 | |
| WO | 2011159343 A1 | 12/2011 | |
| WO | 2012021160 A1 | 2/2012 | |
| WO | 2012031193 A1 | 3/2012 | |

OTHER PUBLICATIONS

Gerighausen DE102009044510A1 2011 English Translation (Year: 2011).*

"International Search Report and the written opinion received for PCT Patent Application No. PCT/US2019/053428, dated Jan. 17, 2020", 4 Pages.

"International Search Report nd the Written Opinion received for PCT Patent Application No. PCT/US2020/015445, dated May 7, 2020", 5 Pages.

Kim, Harry, "International Search Report and Written Opinion", 8 Pages.

* cited by examiner

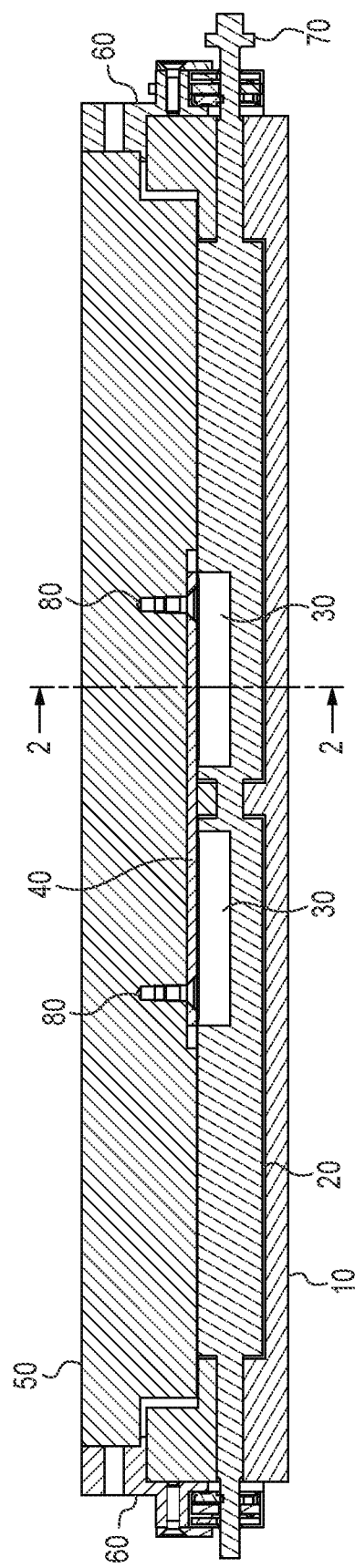
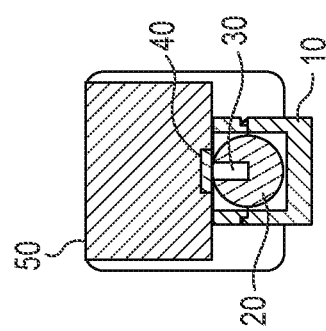
FIG. 1
FIG. 2

EXPANDABLE BELT AND TREAD DRUM WITH MAGNETIC DECK FIXING

REFERENCE TO RELATED APPLICATIONS

This application claims the benefit of U.S. Provisional Application No. 63/120,811 entitled "Expandable Belt and Tread Drum with Magnetic Deck Fixing" filed Dec. 3, 2020, which is incorporated herein by reference in its entirety.

BACKGROUND

The manufacture of a vehicle tire commonly includes the following steps: (1) forming a tire carcass; (2) forming a toroid-shaped belt and "tread package" of the tire separately from the carcass; (3) marrying the belt and tread package to the tire carcass to form a "green tire"; and (4) treating the green tire to form the tread and various other features of a finished tire. Other supplementary steps, such as bonding the belt and tread package to the tire carcass that is often referred to as "stitching" the belt and tread package, may be performed during and/or following one or more of the aforementioned steps.

The tire carcass typically is formed using a tire building drum of the type described in U.S. Pat. No. 6,457,505. The tire building drum usually defines a radially expandable and contractible cylindrical working surface upon which the tire carcass is formed. Subsequent to the tire carcass formation on the cylindrical working surface, the tire carcass may be transferred to an expansion drum of the type discussed in U.S. Pat. No. 6,602,372. The tire carcass is positioned to surround the expansion drum. A portion of the tire carcass is overlaid with the belt and tread package. The tire carcass is then inflated to a toroid shape resembling, though often not identical to, the shape of a finished tire. While the tire carcass is inflated, the belt and tread package is joined to the tire carcass.

The formation of the tire's belt and tread package is typically accomplished using a belt and tread drum of the type disclosed in U.S. Pat. No. 6,013,147. The belt and tread drum usually has an outer cylindrical surface, or circumference, having a plurality of elongated segments, about which one or more layers of the tire belt material are laid to define the belt and tread package. The tire belt material may include reinforcement cords embedded in a polymeric binder. The circumference of the belt and tread drum is capable of expanding and contracting to allow removal of a completed belt and tread package from the drum. A completed belt and tread package is essentially non-expandable radially. However, a completed belt and tread package is flexible to the extent that, when unsupported, the toroid-shaped belt and tread package will deform and sag under the influence of gravity. The adjustable circumference of the belt and tread drum enables a single drum to be used to form belt and tread packages of alternative diameters.

During formation of the belt and tread package on the belt and tread drum, it is not uncommon for the belt and tread drum and accompanying tooling to be configured such that the elongated segments of the belt and tread drum apply considerable pressure to interior surfaces of the belt and tread package. This pressure assists, in part, to maintain a uniform toroid shape of the tire component during formation. Such high pressures applied to the interior surfaces of the tire component can result in at least a portion of the arced exterior surfaces of the elongated segments becoming at least partially imprinted in the tire component, with the following results in the tire component: (1) the formation of very slight imprints of the arcuate exterior surfaces of the elongated segments; and (2) corresponding very slight bulges adjacent the imprints. Further, the radius of curvature of the various arcuate segments forming the belt and tread drum's outer cylindrical surface is fixed by the rigidity of the segments; thus, the rigidity renders it essentially impossible for the segments to be moved between radially expanded and contracted positions and collectively provide perfectly-formed cylindrical surfaces at each of these two positions. If the circumference of the drum is adjusted to a size at which the segments are positioned at a distance from the longitudinal axis that exceeds the radius of curvature of each segment arc, regions will exist about the drum circumference where the circumferentially outward edges of the segments curve slightly radially inwardly from the central portions of the segments. Conversely, if the circumference of the drum is adjusted to a size at which the segments are positioned at a distance from the longitudinal axis less than the radius of curvature of each segment arc, regions will exist about the drum circumference where the circumferentially outward edges of the segments project slightly radially outwardly from the central portions of the segments. In either case, the outer circumference of the belt and tread drum will be very slightly out-of-round. If these out of round regions are large enough, the drum may produce undesirable alternating imprints and bulges of the slightly out-of-round exterior surface of the tire building drum on a tire constructed with the drum. The out-of-round regions may occur when the drum is expanded to allow manufacture of a tire of relatively large diameter. Such imprints and bulges are undesirable because they may later manifest as irregularities in a finished tire. In certain circumstances, these irregularities may produce undesirable effects, such vibration, noise, resonance, a combination, or the like in a rolling tire.

As can be seen from the above description, there is an ongoing need for simple and efficient devices that substantially avoid or reduce the irregularities caused by the imprints and bulges from a slightly out-of-round exterior surface of a tire building drum on a tire. The present invention avoids or ameliorates at least some of the disadvantages of conventional tire building drums.

SUMMARY

According to various example embodiments of the present general inventive concept, an expandable belt and tread drum with magnetic deck fixing is provided that includes an assembly defining a portion of an arcuate outer circumferential working surface of a tire building drum. Various example embodiments of the present general inventive concept may be achieved by providing an assembly which comprises a deck segment carrier and one or more magnetic members provided to the deck segment carrier and configured to attach a deck segment to the deck segment carrier by magnetic force. Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing an assembly where the deck segment carrier comprises a magnet housing to hold the one or more magnetic members. According to various example embodiments of the present general inventive concept, the magnet housing may be configured to be rotatable relative to the deck segment carrier such that the one or more magnetic members may be rotated between a first position in a direction of the deck segment positioned on the deck segment carrier, and a second position in a direction away from the deck segment positioned on the deck segment carrier. According to various example embodiments of the present general inventive concept, the deck segment may be provided with at least a portion of an element having attraction to the magnetic force of the one or more magnetic members. According to various example embodiments of the present general inventive concept, a plurality of differently sized deck segments may be provided configured to be attached to the deck segment carrier. In various example embodiment, the deck segment carrier may be a ramp configured to be reciprocally moved toward and away from a centerline of the tire building drum.

Various example embodiments of the present general inventive concept may also be achieved by providing a deck fixing assembly for an expandable belt and tread drum used to manufacture vehicle tires, comprising an upper ramp portion having a top, a magnet housing rotatably disposed on the top of the upper ramp portion, where the magnet housing forms at least one pocket along an outside edge, at least one magnet positioned in the at least one pocket of the magnet housing, a deck segment set above the upper ramp portion, an insert affixed to an underside of the deck segment, where the insert faces the magnet housing and aligns with the at least one magnet, a first latch housing connected at an end of the upper ramp portion and deck segment, and a second latch housing connected at another end of the upper ramp portion and deck segment. According to various example embodiments of the present general inventive concept, the magnet housing and upper ramp portion may have reciprocal surfaces facing each other. The upper ramp portion may be made of aluminum, the magnet housing may be made of austenitic stainless steel, and the insert may be made of steel. In various example embodiments, the upper ramp portion may have a split along the top, where the magnet housing may be disposed inside the upper ramp portion.

Various example embodiments may be achieved in which the magnet housing forms two pockets along the outside edge, where the at least one magnet is positioned in at least one of the two pockets. In various example embodiments, the at least one magnet may be glued to the magnet housing. In various example embodiments, the magnet housing may be rotatably disposed in one of at least two positions on top of the upper ramp portion. In various example embodiments, the deck fixing assembly may further comprise a first position and a second position, where the at least one magnet may be adjacent to the insert in the first position, and where the at least one magnet may be away from the insert in the second position. In various example embodiments, the magnet may apply a magnetic force to the insert in the first position, and the magnet may apply essentially no magnetic force to the insert in the second position. In various example embodiments, the magnet may apply a stronger magnetic force to the insert in the first position, and the magnet may apply a weaker magnetic force to the insert in the second position. In various example embodiments, the magnet housing may form a latch pin at one end. In various example embodiments, the assembly may further comprise an air gap formed between the at least one magnet and the insert. In various example embodiments, the air gap may be in the range of 0.1 mm to 1.5 mm. In various example embodiments, the air gap may be 0.5 mm.

Other systems, methods, features and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description. The components in the figures are not necessarily to scale; emphasis instead being placed upon illustrating the principles of the invention. In the accompanying drawings and illustrations, the sizes and relative sizes, shapes, and qualities of lines, entities, and regions may be exaggerated for clarity. In the figures, like referenced numerals designate corresponding parts throughout the different views. The simplified diagrams and drawings do not illustrate all the various connections and assemblies of the various components, however, those skilled in the art will understand how to implement such connections and assemblies, based on the illustrated components, figures, and provided descriptions.

FIG. 1 represents a longitudinal cross-section view of a deck fixing assembly with an upper ramp portion for an expandable belt and tread drum employing telescoping ramp members with deck segments positionable on upper portions.

FIG. 2 represents an axial cross-section view at section 2-2 of the deck fixing assembly of FIG. 1.

DETAILED DESCRIPTION

Figure 3:
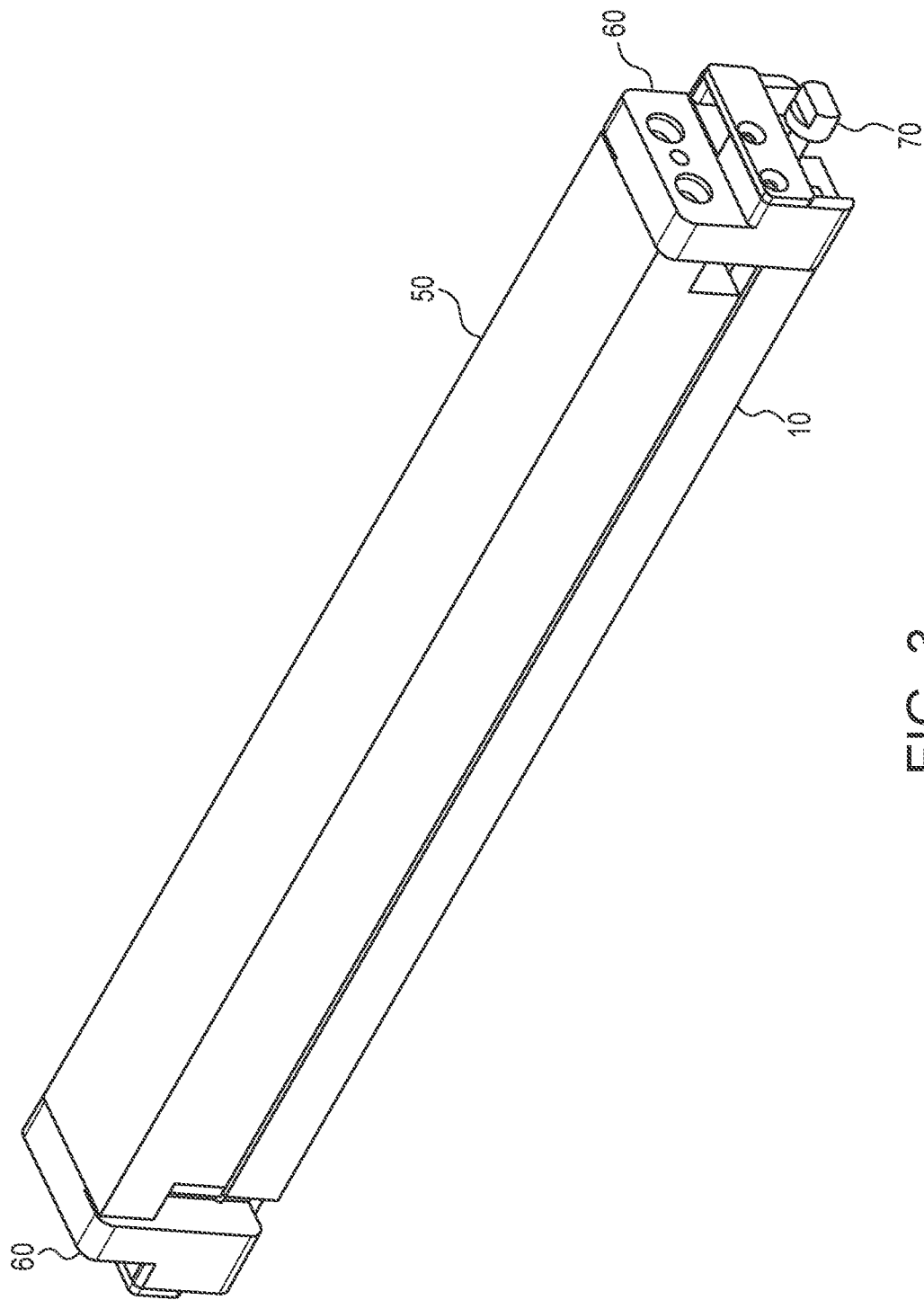
FIG. 3 represents an anterior perspective view of the deck fixing assembly of FIG. 1.

An expandable belt and tread drum has a deck fixing assembly for manufacturing vehicle tires. The deck fixing assembly is a radially expandable and contractible deck with magnetic deck fixing; i.e., with magnetic components for attaching different deck segments. The magnetic deck fixing enables the interchange or swap-out of differently configured segments on the expandable belt and tread drum and thus provides the different circumferences desired for different tire builds. The different circumferences substantially avoid or reduce the imprints and bulges that can result from a slightly out-of-round exterior surface of a tire building drum on a tire. The expandable belt and tread drum with magnetic deck fixing substantially avoids or reduces the irregularities from such imprints and bulges that may produce undesirable effects in a rolling tire such vibration, noise, resonance, a combination, or the like.

The expandable belt and tread drum has segment carriers having one or more magnetic elements such that the segment carriers may be held in place on the tire drum through magnetic force. The expandable belt and tread drum may have a host of differently configured movable ramps, linkages, or other telescoping members that move deck segments to different radial distances from a longitudinal centerline of the belt and tread drum. The deck segments can be moved back and forth between a completely collapsed state and a fully expanded state. As used herein, the terms "deck," "deck segments," and "segments" may be used interchangeably.

The expandable belt and tread drum may have an assembly defining a portion of an arcuate outer circumferential working surface of a tire building drum. The assembly may include a deck segment carrier with one or more magnetic members configured to attach a deck segment to the deck segment carrier by magnetic force. The deck segment carrier may include a magnet housing to hold the one or more magnetic members. The magnet housing may be configured to be rotatable relative to the deck segment carrier such that the one or more magnetic members may be rotated between a first position in a direction of the deck segment positioned on the deck segment carrier, and a second position in a direction away from the deck segment positioned on the deck segment carrier. The deck segment may be provided with at least a portion of an element having attraction to the magnetic force of the one or more magnetic members. The assembly may further include a plurality of differently sized deck segments configured to be attached to the deck segment carrier. The deck segment carrier may be a ramp configured to be reciprocally moved toward and away from a centerline of the tire building drum.

FIG. 1 represents a longitudinal cross-section view of a deck fixing assembly having an upper ramp portion 10 for an expandable belt and tread drum employing telescoping ramp members with deck segments positionable on upper portions. FIG. 2 represents an axial cross-section view at section 2-2 of the deck fixing assembly of FIG. 1. The upper ramp portion 10 has a top configured to receive a magnet receiving member or magnet housing 20 that is rotatably disposed on the top of the upper ramp section 10. Rotatably disposed includes partial and full rotations of magnet housing 20 on top of the upper ramp portion 10. The upper ramp portion 10 and the magnet housing 20 have reciprocal surfaces that face each other. The reciprocal surfaces remain parallel and adjacent to each other, where the bulge or protuberance of one surface matches or fits the recess or niche of the other surface, longitudinally along the length of magnet housing 20. The reciprocal surfaces may extend partially, intermittently, or fully between the upper ramp portion 10 and the magnet housing 20. The magnet housing 20 is rotatably disposed on top of the upper ramp portion to turn or rotate fully or partially between two or more positions, and preferably between two positions. The magnet housing 20 forms one or more pockets or receiving portions along an outside edge. One or more magnets 30 are disposed in the one or more pockets. The magnets 30 maybe glued to the magnet housing 20 in the pockets of the magnet housing 20. The upper ramp portion 10 may be formed of aluminum, and may be split at along the top to allow the magnet receiving member or magnet housing 20 to be disposed or held partially or fully inside. The magnetic receiving member or magnet housing 20 preferably is a non-magnetic material such as austenitic stainless steel or the like.

A deck segment 50 is set above the upper ramp portion 10 and faces the magnet housing 20. An insert 40 is affixed to an underside of the deck segment 50 by one or more fixing members 80 such as bolts, screws, a combination, or the like. The insert 40 faces or is adjacent to the magnet housing 20; more particularly, the insert 40 aligns with the magnets 30 in the pockets formed by the magnet housing 20. While preferably made of steel, the insert 40 may be made of iron, other iron-alloys, other magnetically-attractive materials, a combination or composite, or the like.

First and second latch housings or assemblies 60 are connected to each end of the upper ramp 10 and deck segment 50 to hold the deck segment 50 adjacent to the upper ramp portion 10. The first and second latch housings or assemblies 60 receive end projections of the magnet housing 20 and hold the magnet housing 20 in the desired orientation—one of the two or more positions—adjacent to the deck segment 50. Preferably, one of the end projections forms a latch pin or lever 70 that is configured to be turned by a spanner or like tool.

The magnet receiving member or magnet housing 20 rotates to place the magnets 30 into positions selectively adjacent to or away from the insert 40. The magnet housing 20 may be configured or formed into a latch pin or lever 70 to assist in rotating and holding the magnet housing in place.

Positions adjacent to the insert 40 include positions near or essentially next to the insert 40, where the magnets 30 apply a magnetic force or a stronger magnetic force to the insert 40. Positions adjacent to the insert 40 also include positions within +/−30 degrees and preferably 0 degrees rotation from the insert 40, or any position where the magnets apply a stronger magnetic force on the insert 40 than a position away from the insert 40, or the like.

Positions away from the insert 40 include positions essentially next to the upper ramp portion 10, where the magnets 30 apply essentially no magnetic force or a weaker magnetic force to the insert 40. Positions away from the insert 40 also include positions near or closer to the upper ramp portion 10 than to the insert 40, within 150 degrees to 210 degrees and preferably a 180 degrees rotation from the insert 40, or any position where the magnets 30 apply a weaker magnetic force on the insert 40 than a position adjacent to the insert 40, or the like.

In use, the magnet housing 20 rotates or otherwise moves between two or more positions. Preferably, the magnet housing 20 rotates or moves between a first position and a second position. The magnet housing 20 is disposed in one of the first position or second position, and then rotates or moves into the other position. In the first position, the magnets 30 are adjacent to the insert 40. In the second position, the magnets 30 are away from the insert 40. The magnet housing 20 rotates from the first position to the second position so the deck segment 50 may be removed with less or no resistance from the magnets 30.

The upper ramp portion 10 has strong magnetic members to hold the deck segments down. The magnets preferably are housed in a rotating shaft or magnet housing 20, such that they can be turned "on and off" by rotating the shaft 20. The magnet housing 20 may be a rotating shaft with an end projection or lever 70 at one (outboard) end that can be locked down (below the deck) when the magnets are "on" (oriented upward toward the deck segment 50), and then the lever 70 sticks up when the magnets are "off." The lever 70 may be a spanner flat in the locked position where the magnets 30 are essentially at the top, toward the deck segment 50 and are essentially at the center of the insert 40. When rotated, the magnet housing 20 turns the magnets 30 away from the insert 40, thus allowing the deck segment 50 to be lifted clear after unlatching.

Preferably, there is an air gap formed between the magnets 30 and the insert 40 fixed to the underside of the deck segment 50. The air gap essentially prevents contact between the magnets 30 and the insert 40. The air gap may be in the range of 0.1 mm to 1.5 mm, preferably in the range of 0.3 mm to 0.7 mm, and more preferably 0.5 mm. The magnets 30 maybe glued or otherwise attached in the pockets of the magnet housing 20. In operation, the deck segment 50 will pull down onto datums, the latch housings or latch assemblies 60 at each end, and a pad in the center.

The various components may be formed of different elements, materials, combinations, and the like than those previously described. The upper ramp portion 10 may be plain aluminum, but also maybe anodized or anolubed, may include some type of bushing. The magnet housing 20 may be austenitic stainless steel, but also may be an assembly made up of a steel bar fitted with aluminum bosses. The magnet housing 20 may form one or more pockets, each sized to accept different quantities of magnets, such as two sets of four magnets, and the like. The magnets may be composed of one or magnetic materials, a combination or composite, or the like such as neodymium iron boron (NdFeB), samarium cobalt (SmCo), alnico (aluminum, nickel, and cobalt), and ceramic or ferrite (sintered iron oxide and barium or strontium carbonate) magnets.

Figure 4:
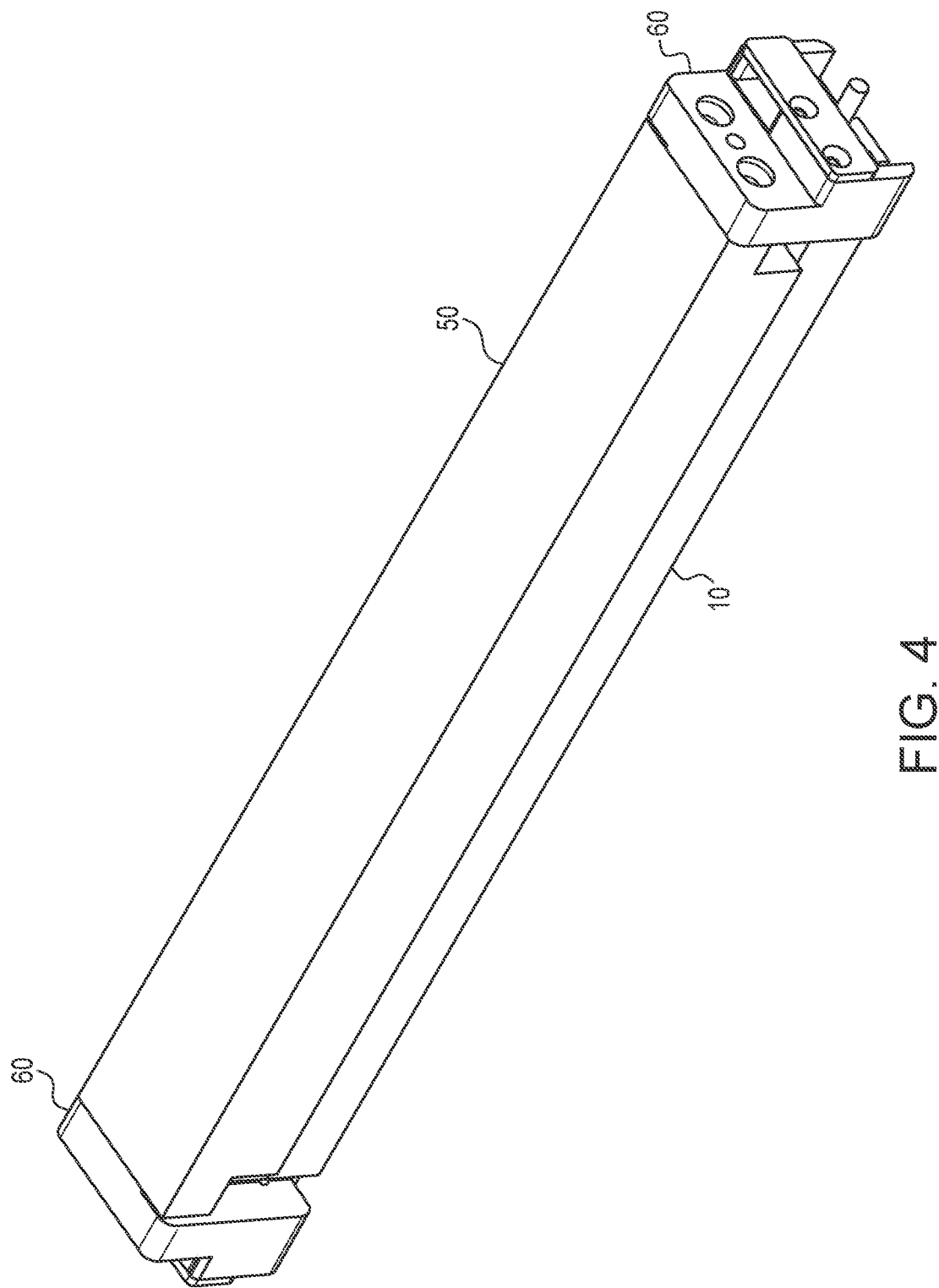
FIG. 4 represents a posterior perspective view of the deck fixing assembly of FIG. 1.
Figure 5:
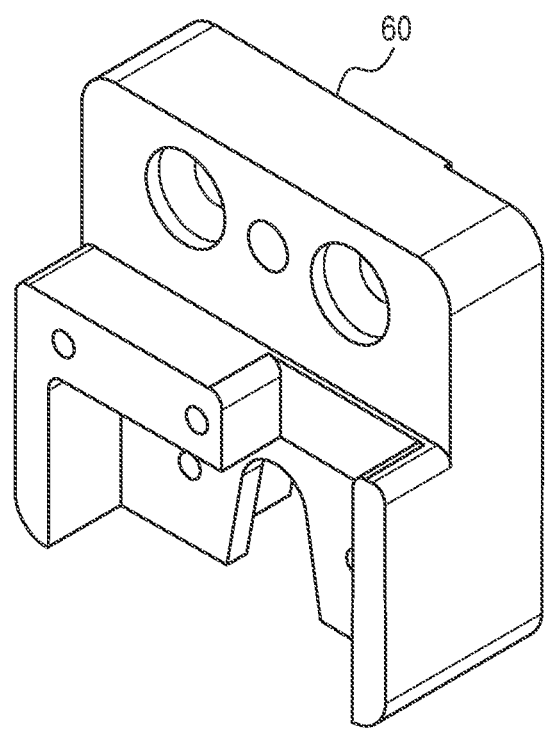
FIG. 5 represents a perspective view of a latch assembly of the deck fixing assembly of FIG. 1.
Figure 6:
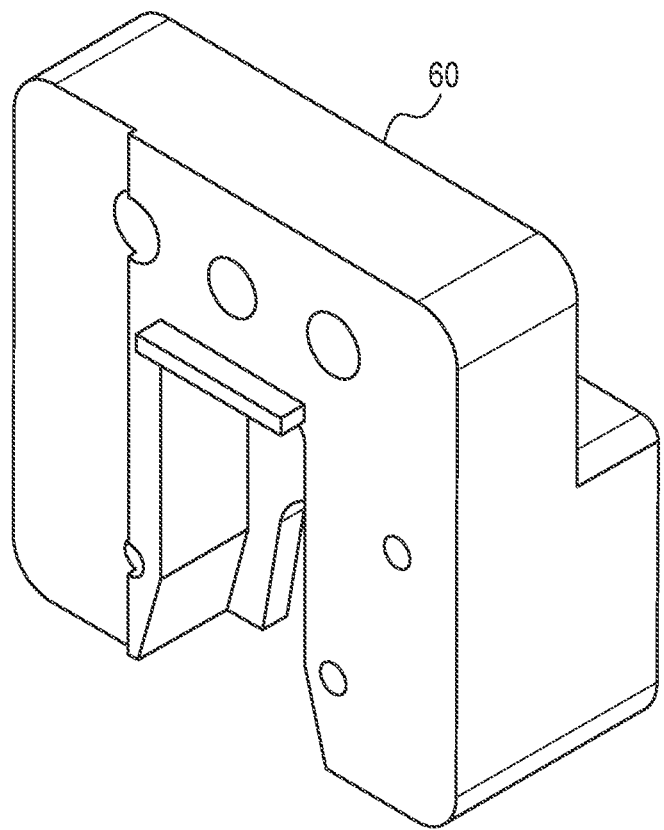
FIG. 6 represents a perspective view of another latch assembly of the deck fixing assembly of FIG. 1.

FIG. 3 and FIG. 4 represent different perspective views of the deck fixing assembly of FIG. 1. FIG. 5 and FIG. 6 represent perspective views of latch assemblies of the deck fixing assembly of FIG. 1. These configurations and various magnetic elements may be greatly varied without departing from the scope of the general inventive concept. Thus, by using magnets as a way of securing deck segments onto a drum, multiple sets of decks for different sizes of tires may be conveniently used with the same drum.

To provide a clear and more consistent understanding of the specification and claims of this application, the following definitions are provided.

Note that spatially relative terms, such as "up", "down", "right", "left", "beneath", "below", "lower", "underside", "above", "upper", "top", and the like, may be used for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used are interpreted accordingly.

Unless the context clearly dictates otherwise, where a range of values is provided, each intervening value to the tenth of the unit of the lower limit between the lower limit and the upper limit of the range is included in the range of values.

The terms "a", "an", and "the" used in the specification claims are to be construed to cover both the singular and the plural, unless otherwise indicated or contradicted by context. No language in the specification should be construed as indicating any non-claimed element to be essential to the practice of the invention.

While various aspects of the invention are described, it will be apparent to those of ordinary skill in the art that other embodiments and implementations are possible within the scope of the invention. Accordingly, the invention is not to be restricted except in light of the attached claims and their equivalents.

The invention claimed is:

1. An assembly defining a portion of an arcuate outer circumferential working surface of a tire building drum, the assembly comprising:
a deck segment carrier;
a magnet housing rotatably mounted along the deck segment carrier;
one or more magnetic members provided along the magnet housing and configured to attach a deck segment to the magnet housing by magnetic force;
wherein the magnet housing is rotatable along a central axis thereof in relation to the deck segment carrier such that the one or more magnetic members may be rotated between a first position in a direction toward a deck segment positioned on the deck segment carrier to attach the deck segment to the magnet housing by magnetic force, and a second position in a direction away from the deck segment positioned on the deck segment carrier to detach the deck segment from the magnet housing.

2. The assembly of claim 1, where the deck segment is provided with at least a portion of an element having attraction to the magnetic force of the one or more magnetic members.

3. The assembly of claim 1, further comprising a plurality of differently sized deck segments configured to be attached to the deck segment carrier.

4. The assembly of claim 1, where the deck segment carrier is a ramp configured to be reciprocally moved toward and away from a centerline of the tire building drum.

5. A deck fixing assembly for an expandable belt and tread drum used to manufacture vehicle tires, comprising:
an upper ramp portion having a top;
a magnet housing rotatably disposed on the top of the upper ramp portion, where the magnet housing forms at least one pocket along an outside edge;
at least one magnet positioned in the at least one pocket of the magnet housing;
a deck segment set above the upper ramp portion;
an insert affixed to an underside of the deck segment, where the insert faces the magnet housing and aligns with the at least one magnet;
a first latch housing connected at an end of the upper ramp portion and deck segment; and
a second latch housing connected at another end of the upper ramp portion and deck segment;
wherein the magnet housing is rotatable in relation to the upper ramp portion such that the magnet may be rotated between a first position in a direction toward a deck segment positioned on the deck segment carrier to attach the deck segment to the magnet housing by magnetic force, and a second position in a direction away from the deck segment positioned on the deck segment carrier to detach the deck segment from the magnet housing.

6. The deck fixing assembly of claim 5, where the magnet housing and upper ramp portion have reciprocal surfaces facing each other.

7. The deck fixing assembly claim 5, where the upper ramp portion is made of aluminum, where the magnet housing is made of austenitic stainless steel, and where the insert is made of steel.

8. The deck fixing assembly of claim 5, where the upper ramp portion has a split along the top, where the magnet housing is disposed inside the upper ramp portion.

9. The deck fixing assembly of claim 5, where the magnet housing forms two pockets along the outside edge, where the at least one magnet is positioned in at least one of the two pockets.

10. The deck fixing assembly of claim 5, where the at least one magnet is glued to the magnet housing.

11. The deck fixing assembly of claim 5, where the magnet housing is rotatably disposed in one of at least two positions on top of the upper ramp portion.

12. The deck fixing assembly of claim 11, further comprising a first position and a second position, where the at least one magnet is adjacent to the insert in the first position, and where the at least one magnet is away from the insert in the second position.

13. The deck fixing assembly of claim 12, where the magnet applies a magnetic force to the insert in the first position, and where the magnet applies essentially no magnetic force to the insert in the second position.

14. The deck fixing assembly of claim 12, where the magnet applies a stronger magnetic force to the insert in the first position, where the magnet applies a weaker magnetic force to the insert in the second position.

15. The deck fixing assembly of claim 5, where the magnet housing forms a latch pin at one end.

16. The deck fixing assembly of claim 5, further comprising an air gap formed between the at least one magnet and the insert.

17. The deck fixing assembly of claim 16, where the air gap is in the range of 0.1 mm to 1.5 mm.

18. The deck fixing assembly of claim 16, where the air gap is 0.5 mm.

* * * * *